Nov. 5, 1957 G. L. PEARSON 2,812,446

PHOTO-RESISTANCE DEVICE

Filed March 5, 1954

INVENTOR
G. L. PEARSON
BY
Arthur J. Torsiglieri
ATTORNEY 2,812,446
Patented Nov. 5, 1957

2,812,446

PHOTO-RESISTANCE DEVICE

Gerald L. Pearson, Bernards Township, Somerset County, N. J., assignor to Bell Telephone Laboratories, Incorporated, New York, N. Y., a corporation of New York Application March 5, 1954, Serial No. 414,276

2 Claims. (Cl. 250—211)

This invention relates to photosensitive apparatus and more particularly to arrangements in which the current flow in an electrical circuit is controlled by the intensity of light incident on a semiconductive silicon body.

A broad object of the invention is to improve arrangements which utilize the light incident on a photosensitive element for control purposes or for the transmission of signal information.

A more specific object is to provide a novel and improved form of semiconductive photosensitive element.

Conduction occurs in electronic semiconductors by means of two types of charge carriers, electrons and holes. Generically, those conductors wherein conduction is in the main by electrons are called n-type, while those wherein conduction occurs by holes are called p-type. The conductivity transition region between two contiguous zones of opposite conductivity type is known as a p-n junction.

An important feature of the present invention is a silicon semiconductive photoconductive element comprising a single crystal body having contiguous zones of p- and n-type conductivity of which one of the two zones is extremely thin to be as transparent as possible to the incident radiation. In particular, the thin zone has a thickness no wider than the order of the diffusion length of the minority carriers in that zone.

A photoconductive element is one that has a relatively high internal resistance in the dark, which resistance is lowered in proportion to the intensity of the light impinging thereon. In operation, such an element is generally connected serially with an external voltage source and a load so that the resistance variations of the photoconductive element under the control of light fluctuations will result in corresponding voltage fluctuations across the load.

It has been known hitherto that a semiconductive body including a p-n junction is suitable for use as a photoconductive element. Light of an appropriate wavelength penetrating into a semiconductive body near the region of a p-n junction is able to produce electron-hole pairs therein which become separated under the influence of the electrostatic potential fields created by the p-n junction. The presence of such unbound holes and electrons during the time the light is incident on the semiconductive body increases the conductivity of the semiconductive body to a considerable degree.

For high sensitivities to the intensity of the light flux incident on the semiconductive body, various factors are important. First, it is important to provide penetration of the light to the region of the p-n junction over as wide an area as possible. To this end, it is advantageous that the plane of the p-n junction be perpendicular to the direction of the light. Moreover, because both the recombination of electron-hole pairs before they diffuse across the p-n junction can be a source of serious loss and the penetration of light in a semiconductive body tends to be extremely shallow, it is important to place the p-n junction as near to the surface as possible. To this end, in a silicon photoconductive body of the kind which forms a feature of the present invention one of the two contiguous zones forming the p-n junction should be sufficiently thin as to be transparent as possible to the incident radiation. A large area photoconductive cell of this kind is well adapted for use with wide light beams of low intensity. This makes it possible to achieve high sensitivities without expensive optical accessories to focus the light to a small spot of high intensity.

It is also important that the photoconductive element have a high resistance in dark light and a low resistance when exposed to light. To meet the first requirement it is desirable to have high resistivities in the two zones forming the p-n junction, while to meet the second requirement it is advantageous to have as low a resistivity as possible for each of the two zones as well as low resistance ohmic connections thereto.

The choice of silicon as the semiconductive material in preference to other semiconductive materials offers initially important advantages. Silicon can be prepared to provide very favorable dark-light characteristics even when subjected to high reverse voltages. The reverse currents set up by temperature rises in silicon are very small. Moreover, silicon lends itself readily to the formation of extremely thin uniform surface layers of a desired conductivity type by the vapor diffusion techniques described in copending application Serial No. 414,272, filed March 5, 1954, by C. S. Fuller.

An important specific feature of the present invention is a silicon photoconductive element comprising an n-type conductivity zone which is contiguous to a thin p-type surface zone formed by the diffusion therein of boron p-type impurities.

The choice of boron in combination with the silicon provides added advantages. Extremely thin boron-diffused p-type zones can be readily formed on silicon n-type wafers with a high degree of uniformity. Such zones can be made to have a relatively low internal resistance. Moreover, low resistance ohmic connections can easily be made to such zones by metallizing techniques.

Moreover, in many applications of photoconductive elements, for example, as switching elements in a telephone transmission system, it is desirable to have a regular array of photoconductive elements. Another feature of the present invention is a single crystal silicon body having a zone of one conductivity type and a plurality of thin zones of opposite conductivity type forming a plurality of distinct and spaced p-n junctions within the body. Such a body can be utilized as an array of photoconductive elements. Moreover, to minimize cross talk between the various elements, it is desirable that the silicon body be provided with a plurality of pits or cavities along one surface, the inner surface, or lining, of each pit forming a zone of opposite conductivity type from the gross portion of the body.

The invention will be better understood from the following more detailed description taken in conjunction with the accompanying drawings in which.

Figure 1:
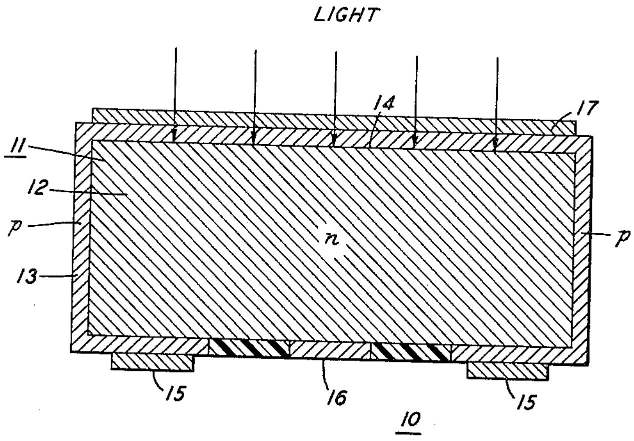
Fig. 1 shows a silicon photoconductive element of the kind which forms the principal feature of the present invention.

Referring now more particularly to the drawings, photoconductive element 10 comprises a single crystal silicon body 11 including a zone 12 of n-type conductivity and contiguous thereto a zone 13 of p-type conductivity resulting from a predominance therein of boron significant impurities. The p-type zone forms a broad area planar junction 14 with the n-type zone and in operation it is exposed to the incident radiation, the p-type zone being advantageously substantially transparent to the radiation along the front whereby the radiation can penetrate close to the junction. In particular, to keep recombination losses low it is important to have that portion of zone 13 along the front face of the body no thicker than of the order of the diffusion length of electrons in the zone. Additionally, the p-type zone extends around to the back face of the element to permit making ohmic connections to the p-type zone without obstructing the face of the element to the incident radiation.

In one illustrative embodiment of the invention, the n-type zone has a thickness of 40 mils and a resistivity of 0.3 ohm centimeter and the p-type zone a thickness of 0.1 mil and a resistivity of .001 ohm centimeter.

A silicon body of this kind can be formed readily in accordance with the diffusion techniques described in the afore-mentioned Fuller application. To this end, a silicon wafer of suitable size and shape is heated to a temperature of 1000° centigrade for 5.5 hours in an atmosphere of boron trichloride under a pressure of 15 centimeters of mercury. This provides a uniform layer of p-type conductivity on the n-type core. Thereafter, a portion of the p-type layer is removed from a portion of the back surface of the wafer to expose an intermediate region of n-type conductivity, to which ohmic connection can be made.

To form ohmic connections to the n- and p-type zones, a suitable noncontaminating metal such as rhodium is plated on portions of the back surface of the silicon body to form coatings 15 and 16. Leads are then connected to these coatings to form circuit connections.

It may be desirable also to treat the surface to be exposed to the incident light to minimize reflections. To this end, a coating of polystyrene 17 which has an index of refraction intermediate that of silicon and free space is found advantageous.

Figure 2:
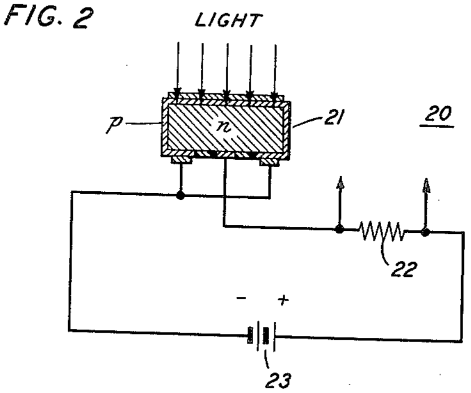
Fig. 2 shows a circuit arrangement in which a photoconductive element serves as a switch.

In the circuit arrangement 20 shown in Fig. 2, a p-n silicon diode 21 of the kind shown in Fig. 1 is connected in series with a load 22, shown here schematically as a resistance, and a source 23 of D.-C. voltage. The load resistance should be appreciably less than the dark light resistance of the diode and greater than its bright light resistance. The D.-C. voltage is applied to bias the diode 21 in the reverse direction, i. e., the connection to the p-type zone of the diode is from the negative side of the voltage source 23 and the connection to the n-type zone from the positive side. It is important that the reverse bias applied to the diode is sufficiently low to avoid breakdown. It is generally convenient to operate at a voltage about one-half the breakdwon voltage. The breakdown voltage can be controlled by the resistivities of the p- and n-type zones of the diode. For the specific design described for the diode shown in Fig. 1, the breakdown voltage is about 95 volts. By substituting an n-type zone of 3.0 ohm centimeters resistivity, a breakdown voltage of about 225 volts is achieved. The breakdown voltage can be quite accurately controlled from values of a few volts to values of several hundred volts. The higher the voltage of operation, the more power can be supplied to the load.

In operation with no light incident on the diode, the voltage supplied by the source will appear almost completely across the diode with very little across the load, because of the larger resistance of the diode. However, incident light will reduce the resistance of the diode so that a larger share of the voltage supplied by the source will appear across the load. By insuring that the incident light will in each case be of sufficient intensity to make the resistance of the diode appreciably less than that of the load, the voltage applied by the source can be switched almost completely across the load.

Figure 3:
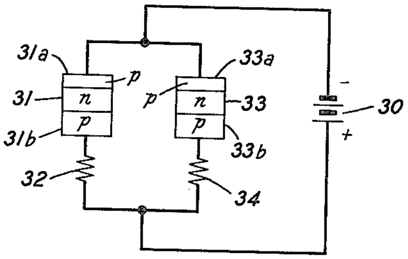
Fig. 3 shows an arrangement which includes a pair of switching branches, each including a silicon p-n-p diode in accordance with one feature of the invention.

In some applications, it is likely that a plurality of switching circuits will be supplied from a common voltage source in a manner that tends to introduce cross talk between the various circuits. For example, a plurality of photosensitive elements, each supplying its own load, may, for purposes of convenience, have a common voltage source and so may be viewed as in parallel with one another. It is desirable in such an arrangement to provide that the voltage drop across an element which is energized by incident light does not affect the other parallel branches. For this purpose it is desirable to include in each branch path a unilaterally conductive element which will pass currents of the sign corresponding to changes in the resistance of its photoconductive cell but block currents of opposite sign. To this end, it may be advantageous to use in place of a silicon p-n photoconductive diode, a silicon p-n-p photoconductive diode which differs from that described essentially only in the inclusion of a p-type zone between the n-type zone and ohmic connection thereto for increased isolation of the various circuits. Fig. 3 illustrates a typical arrangement.

In the arrangement shown in Fig. 3, a common voltage source 30 supplies two switching branches, each including a load resistance 32, 34 and a p-n-p silicon diode 31, 33 having one transparently thin p-type surface **31*a*, 33*a* zone on which the light impinges for forming a reverse-biased p-n junction with respect to source 30 and another p-type surface zone 31*b*, 33*b* for forming a forward-biased p-n junction with respect to source 30**. This latter junction, although providing only a low impedance to current flowing therethrough as a result of light incident on its associated diode, offers a high impedance to current flowing through the other branch. Such a diode can be formed by diffusing boron into a cylindrical silicon wafer to form a surface layer, lapping off the cylindrical surface layer and making ohmic connections to the two end surface zones, the connection to the surface to be exposed to light being to the edge of the surface to minimize obstruction to the light.

Figure 4:
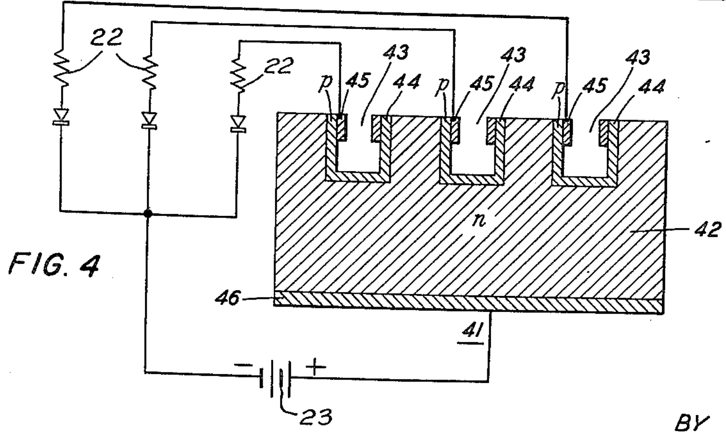
Fig. 4 shows a single silicon body which includes a plurality of photoconductive elements in accordance with another feature of the invention.

Fig. 4 shows how a single silicon body 41 can be used as a plurality of photoconductive elements. One surface of the body is provided with a plurality of pits 43 which advantageously may be arrayed in some desired order. The gross portion of the body forms an n-type conductivity zone 42 while the lining of each pit forms a zone 44 of p-type conductivity having a predominance of boron impurities for forming a plurality of distinct p-n junctions within the body. Each zone 44 is essentially of the kind described in connection with the photoconductive element of Fig. 1, having a thickness along the portion to be exposed to the incident radiation comparable to the diffusion length of electrons in the zone.

For forming such a body, an n-type silicon bar is provided with a series of pits in the desired array. Such pits can be formed by well-known etching techniques. Thereafter, the silicon bar is heated in an atmosphere of boron trichloride, under conditions as described above, to form a p-type layer over the complete surface of the bar. This p-type layer thereafter is removed over all of the bar surface except the regions corresponding to the surfaces of the pits. A separate ohmic connection is made to each p-type zone by plating a wall portion of the corresponding pit with rhodium to form a coating 45. Similarly, an ohmic connection is made to the n-type zone by means of rhodium coating 46 thereon.

The silicon body 41 effectively provides a plurality of parallel photosensitive elements, each of which is associated with its own load and each of which is supplied from a common voltage source in accordance with the principles of the arrangements of Figs. 2 and 3. To this end, the electrode 46, which makes ohmic connection with the n-type zone 42, is connected to the positive terminal of the common voltage source 23. Each of the electrodes 45 which make ohmic connection to the p-type zone 44 is connected by its separate branch path including a load 22 to the negative terminal of the common voltage source 23 in accordance with the principles previously described for arrangements involving a plurality of photosensitive elements associated with a plurality of parallel branch paths. Additionally, as discussed above, to minimize cross talk, a unilaterally conductive element which will pass current of the sign corresponding to changes in the resistance of the cell included in its branch path but block currents of the opposite sign is advantageously inserted in each branch path in order to minimize cross talk between the separate branch paths.

What is claimed is:

1. In combination, a silicon body having a gross portion of n-type conductivity and having a plurality of surface zones of a thickness comparable to the diffusion length of electrons in said zones, in which boron is the predominant impurity whereby said zones are of p-type conductivity, an electrode making ohmic connection to the n-type gross portion of the body, a plurality of separate electrodes each making ohmic connection to a separate p-type surface zone, a voltage source having its positive terminal connected electrically to the electrode making ohmic connection to the n-type gross portion of the body, and means for forming a plurality of branch paths, each branch path comprising a separate load and a separate unilaterally conductive element and being connected electrically between the negative terminal of the voltage source and a separate one of the electrodes making ohmic connection to the p-type surface zones.

2. In combination, a silicon body having a gross portion of n-type conductivity and having a plurality of surface depressions, each depression having its surface zone of boron diffused p-type conductivity of a thickness comparable to the diffusion length of electrons in said zone, an electrode making ohmic connection to the n-type gross portion of the body, a plurality of separate electrodes each making ohmic connection to a separate p-type surface zone, a voltage source having its positive terminal connected to the electrode making ohmic connection to the n-type gross portion of the body, and means for forming a plurality of branch paths, each branch path comprising a separate load and a separate unilaterally conductive element and being connected between the negative terminal of the voltage source and a separate one of the electrodes making ohmic connection to the p-type surface zones.

References Cited in the file of this patent

UNITED STATES PATENTS

| | | |
|---|---|---|
| 2,644,852 | Dunlap | July 7, 1953 |
| 2,669,635 | Pfann | Feb. 16, 1954 |
| 2,671,154 | Burstein | Mar. 2, 1954 |